(12) United States Patent
Ding et al.

(10) Patent No.: US 11,148,124 B2
(45) Date of Patent: Oct. 19, 2021

(54) HIERARCHICAL ZEOLITE Y AND NANO-SIZED ZEOLITE BETA COMPOSITE

(71) Applicant: Saudi Arabian Oil Company, Dhahran (SA)

(72) Inventors: Lianhui Ding, Dhahran (SA); Ibrahim Al-Nutaifi, Dhahran (SA); Manal Al-Eid, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 27 days.

(21) Appl. No.: 16/703,461

(22) Filed: Dec. 4, 2019

(65) Prior Publication Data

US 2021/0170376 A1   Jun. 10, 2021

(51) Int. Cl.
| | | |
|---|---|---|
| *B01J 29/70* | (2006.01) | |
| *B01J 6/00* | (2006.01) | |
| *B01J 23/883* | (2006.01) | |
| *B01J 23/888* | (2006.01) | |
| *B01J 35/02* | (2006.01) | |

(Continued)

(52) U.S. Cl.
CPC ........... *B01J 29/7007* (2013.01); *B01J 6/001* (2013.01); *B01J 23/883* (2013.01); *B01J 23/8885* (2013.01); *B01J 35/023* (2013.01); *B01J 37/0045* (2013.01); *B01J 37/0201* (2013.01); *B01J 37/0236* (2013.01); *B01J 37/036* (2013.01); *B01J 37/038* (2013.01); *B01J 37/04* (2013.01); *C10G 11/05* (2013.01)

(58) Field of Classification Search
CPC .. B01J 23/883; B01J 23/8885; B01J 29/7007; B01J 35/023; B01J 37/0045; B01J 37/0201; B01J 37/0236; B01J 37/036; B01J 37/038; B01J 37/04; B01J 6/001; C10G 11/05

See application file for complete search history.

(56) References Cited

U.S. PATENT DOCUMENTS

| 4,180,689 A | 12/1979 | Davies et al. |
| 4,740,292 A | 4/1988 | Chen et al. |

(Continued)

FOREIGN PATENT DOCUMENTS

| AU | 465697 | 10/1972 |
| AU | 2014413311 | 7/2017 |

(Continued)

OTHER PUBLICATIONS

Lascelles, K. et al. (2012) "Nickel Compounds" in Ullmann's Encyclopedia of Industrial Chemistry, 24, Wiley-VCH-Verlag, 117-132.*

(Continued)

*Primary Examiner* — Brian A McCaig
(74) *Attorney, Agent, or Firm* — Fish & Richardson P.C.

(57) ABSTRACT

A method is provided for forming composite of nano-sized zeolite beta and hierarchical zeolite Y. The method includes synthesizing a hierarchical zeolite Y, synthesizing a gel of a nano-sized zeolite beta, forming a slurry of the nano-sized zeolite beta from the gel, and mixing the hierarchical zeolite Y with the slurry to form a composite. The composite is dried and an extrudable paste is formed from the dried composite. The extrudable paste is extruded to form extrudates, which are calcined to form calcined extrudates.

12 Claims, 3 Drawing Sheets

(51) Int. Cl.

| | |
|---|---|
| *B01J 37/00* | (2006.01) |
| *B01J 37/02* | (2006.01) |
| *B01J 37/03* | (2006.01) |
| *B01J 37/04* | (2006.01) |
| *C10G 11/05* | (2006.01) |

(56) References Cited

U.S. PATENT DOCUMENTS

| | | | |
|---|---|---|---|
| 5,939,362 | A | 8/1999 | Johnson et al. |
| 6,133,186 | A | 10/2000 | Gosselink et al. |
| 6,232,273 | B1 | 5/2001 | Namba et al. |
| 8,951,498 | B2 | 2/2015 | Larsen et al. |
| 9,145,465 | B2 | 9/2015 | Spencer et al. |
| 9,493,598 | B2 | 11/2016 | Musa et al. |
| 2004/0152587 | A1* | 8/2004 | Creyghton ............... B01J 29/80 502/64 |
| 2006/0030477 | A1* | 2/2006 | Chaumonnot .......... C01B 39/04 502/64 |
| 2011/0277844 | A1 | 11/2011 | Musa et al. |
| 2012/0025882 | A1 | 2/2012 | Shanan |
| 2012/0205286 | A1* | 8/2012 | Francis ................. B01J 35/002 208/89 |
| 2013/0123147 | A1 | 5/2013 | Musa et al. |
| 2015/0322330 | A1 | 11/2015 | Spencer et al. |
| 2017/0321108 | A1 | 11/2017 | Majnouni et al. |
| 2019/0016970 | A1 | 1/2019 | Shaik et al. |
| 2019/0168197 | A1 | 6/2019 | Corma Canos et al. |

FOREIGN PATENT DOCUMENTS

| | | |
|---|---|---|
| CN | 106430235 | 2/2017 |
| EP | 0247678 | 12/1987 |
| EP | 0247679 | 12/1987 |
| EP | 0186447 | 1/1991 |
| EP | 2449153 | 1/2019 |
| WO | WO 1993025798 | 12/1993 |
| WO | WO 1998051902 | 11/1998 |
| WO | WO 2017202495 | 11/2017 |

OTHER PUBLICATIONS

Haber, J. et al. (1995) Pure and Applied Chemistry, 67, 8/9, 1257-1306.*
Akhtar et al, "Aromatization of alkanes over Pt promoted conventional and mesoporous gallosilicates of MEL zeolite," Catalysis Today vol. 179, Issue 1, Jan. 2012, pp. 61-72, 12 pages.
Bhattacharya et al, "Aromatization of n-hexane over H-ZSM-5: Influence of promoters and added gases," Applied Catalysis A: General, vol. 141, issues 1-2, Jul. 1996, pp. 105-115, 11 pages.
Bibby et al, "NH4+-tetraalkyl ammonium systems in the synthesis of zeolites," Nature, 285(5759), pp. 30-31, May 1980, 2 pages.
Camblor et al "Characterization of nanocrystalline zeolite Beta," Microporous and Mesoporous Materials, vol. 25, Issues 1-3, Dec. 1998, pp. 59-74, 16 pages.
Camblor et al, "Synthesis of nanocrystalline zeolite beta in the absence of alkali metal cations," Studies in Surface Science and Catalysis vol. 105, 1997, pp. 341-348.
Ding et al, "Effect of agitation on the synthesis of zeolite beta and its synthesis mechanism in absence of alkali cations," Microporous and Mesoporous Materials, vol. 94. Issues 1-3, Sep. 2006, pp. 1-8.
Dyballa et al, "Parameters influencing the selectivity to propene in the MTO conversion on 10-ring zeolites: directly synthesized zeolites ZSM-5, ZSM-11, and ZsM-22," Applied Catalysis A: General, vol. 510, Jan. 2016, pp. 233-243, 41 pages.
Farrusseng et al, "Zeolite-Encapsulated Catalysts: Challenges and Prospects," Encapsulated Catalysts, Chapter 11, 2017, pp. 335-386, 52 pages.
Garcia-Martinez et al, "A mesostructured Y zeolite as a superior FCC catalyst—from lab to refinery," Chem. Commun., vol. 48, issue 97, pp. 11841-11843, Aug. 2012, 3 pages.

Ghamami et al, "Synthesis and crystal growth of zeolite (NH4, TPA)-ZSM-5," Zeolites, vol. 3, issue 2, Apr. 1983, pp. 155-162, 8 pages.
Hou et al, "Nucleation and Growth of NH4-ZSM-5 Zeolites," Studies in Surface Science and Catalysis,vol. 28, 1986, pp. 239-246, 8 pages.
Kalita et al, "Studies on stability, of nanocrystalline MFI zeolite synthesized by a novel method against OH-attack," Materials Chemistry and Physics, vol. 129, issue 1-2, Sep. 2011, pp. 371-379, 9 pages.
Kim et al, "Oligomerization and isomerization of dicyclopentadiene over mesoporous materials produced from zeolite beta." Catalysis Today, 232, Sep. 2014, pp. 69-74, 6 pages.
Landau et al, "Colloidal Nanocrystals of Zeolite β Stabilized in Alumina Matrix," Chem. Mater. Apr. 1999, 11, 8, pp. 2030-2037, 8 pages.
Li et al, "Realizing the Commercial Potential of Hierarchical Zeolites: New Opportunities in Catalytic Cracking" Chem Cat Chem Review, 6, 10, pp. 46-66, Sep. 2013, 22 pages.
Liu et al, "Synthesis, characterization, and catalytic performance of hierarchical ZSM-11 zeolite synthesized via dual-template route," Chinese Journal of Catalysis, vol. 39, Issue 1, Jan. 2018, pp. 167-180, 14 pages.
Ma et al, "A review of zeolite-like porous materials," Microporous and Mesoporous Materials, vol. 37, Issues 1-2, May 2000, pp. 243-252, 10 pages.
Manimaran et al, "Corrosion Inhibition of carbon steel by polyacrylamide," Research Journal of Chemical Sciences, vol. 2(3), pp. 52-57, Mar. 2012, 6 pages.
Meng et al, "Templating route for synthesizing mesoporous zeolites with improved catalytic properties." Nano Today 4(4), pp. 292-301, Jun. 2009, 10 pages.
Micromeritics [online], "AutoChem II 2920: The Catalyst Characterization Laboratory," AutoChem II brochure, accessed Sep. 30, 2019, URL: <https://www.micrometrics.com/Repository/Files/autochem2920-brochure-2017.pdf> 2007, 5 pages.
Prokesova et al, "Preparation of nanosized micro/mesoporous composites via simultaneous synthesis of Beta/MCM-48 phases," Microporous and Mesoporous Materials vol. 64, Issues 1-3, Oct. 2003, pp. 165-174, 10 pages.
Qin et al, "Mesoporous Y zeolite with homogeneous aluminum distribution obtained by sequential desilication-dealumination and its performance in the catalytic cracking of cumene and 1,3,5-triisopropylbenzene," Journal of Catalysis, vol. 278, Feb. 2011, pp. 266-275, 10 pages.
Van Grieken et al, "Anomalous crystallization mechanism in the synthesis of nanocrystalline ZSM-5," Microporous Mesoporous Materials, vol. 39, issues 1-2, Sep. 2000, pp. 135-147, 13 pages.
Viswanadham et al, "Reaction pathways for the aromatization of paraffins in the presence of H-ZSM-5 and Zn/H-ZSM-5," Applied Catalysis A: General vol. 137, Issue 2, Apr. 1996, pp. 225-233, 9 pages.
Webb, "Introduction to Chemical Adsorption Analytical Techniques and their Applications to Catalysis," MIC Technical Publications, Micromeritics, Jan. 2003, 12 pages.
Xue et al, "Facile synthesis of nano-sized NH4-ZSM-5 zeolites," Microporous and Mesoporous Materials, vol. 156, Jul. 2012, pp. 29-35, 7 pages.
Yang et al, "Incorporating platinum precursors into a NaA-zeolite synthesis mixture promoting the formation of nanosized zeolite," Microporous and Mesoporous Materials, 117(1-2), Jan. 2009, pp. 33-40, 8 pages.
Zhang et al, "Differences between ZSM-5 and ZSM-11 zeolite catalysts in 1-hexene aromatization and isomerization." Fuel Processing Technology vol. 91, Issue 5, May 2010, pp. 449-455, 7 pages.
Zhang et al, "Innovations in hierarchical zeolite synthesis," Catalysis Today, vol. 264, Apr. 2016. pp. 3-15, 13 pages.
PCT Invitation to Pay Additional Fees and, Where Applicable, Piotest Fee in International Appln. No. PCT/US2020/062871, dated Mar. 11, 2021, 16 pages.

(56) References Cited

OTHER PUBLICATIONS

Qin Bo et al., "Synthesis, characterization and catalytic properties of Y-beta zeolite composites," Petroleum Science, China University of Petroleum (Beijing), Heidelberg, May 2011, 8(2): 224-228, 5 pages.
PCT International Search Report and Written Opinion in International Appln. No. PCT/US2020/062871, dated May 4, 2021, 22 pages.

* cited by examiner

HIERARCHICAL ZEOLITE Y AND NANO-SIZED ZEOLITE BETA COMPOSITE

BACKGROUND

The processing of crude oil into more valuable petroleum products often begins with catalytic cracking, such as hydroprocessing. In this process, the high-molecular weight hydrocarbon fractions are broken down into smaller molecules, including paraffinics, gasoline, and hydrocarbon gases, such as olefinics, among others. The catalytic cracking is often catalyzed by zeolites. However, the thermal stability and efficacy of many zeolites during exposure to very broad mixtures of compounds may be limited. Accordingly, when whole crude is used as a feedstock to a hydrocracking process, hydrocracking catalysts that can process both light fractions (for example, less than about 540° C.) and heavy fractions (for example, greater than about 540° C.) are needed.

SUMMARY

An embodiment described in examples herein provides a method for forming a composite of nano-sized zeolite beta and hierarchical zeolite Y. The method includes synthesizing a hierarchical zeolite Y, synthesizing a gel of a nano-sized zeolite beta, forming a slurry of the nano-sized zeolite beta from the gel, and mixing the hierarchical zeolite Y with the slurry to form a composite. The composite is dried and an extrudable paste is formed from the dried composite. The extrudable paste is extruded to form extrudates, which are calcined to form calcined extrudates.

Another embodiment described in examples herein provides a method for directly hydroprocessing a crude oil to form petrochemicals. The method includes flowing a feedstock including at least a portion of the crude oil into a hydroprocessing unit, and hydroprocessing the feedstock using a catalyst including a composite of nano-sized zeolite beta and hierarchical zeolite Y to form a product stream.

Another embodiment described in examples herein provides a hydroprocessing catalyst including a composite of nano-sized zeolite beta and hierarchical zeolite Y, including particles of nano-sized zeolite beta of less than about 100 nm, and particles of hierarchical zeolite Y of about 500 nm.

DETAILED DESCRIPTION

Figure 1:
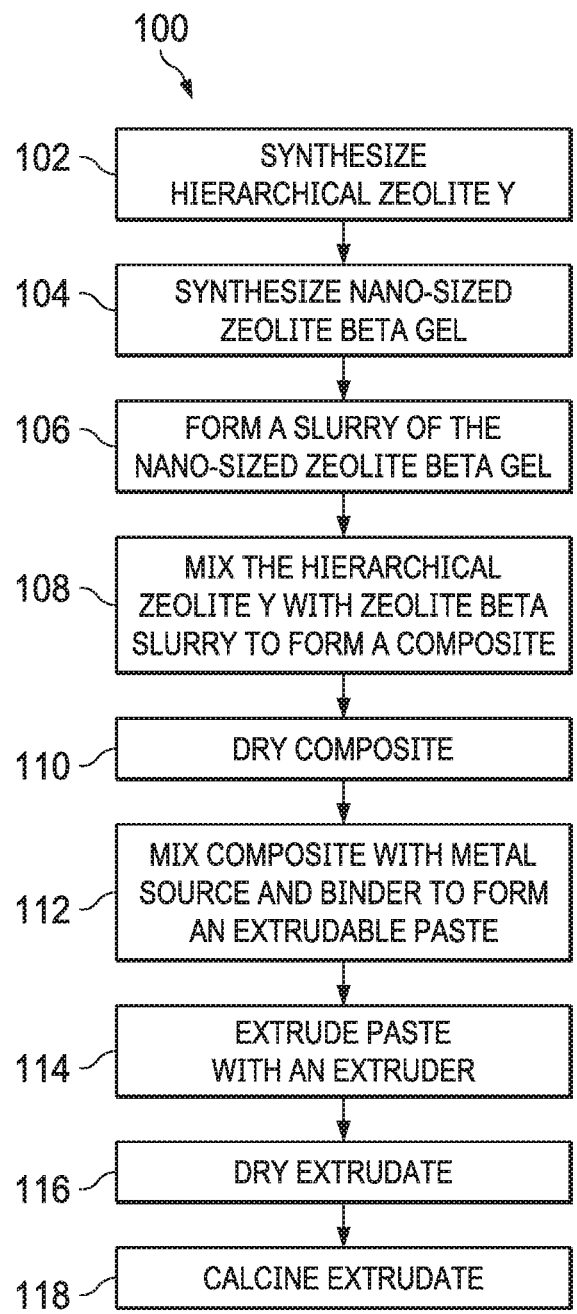
FIG. 1 is a method for forming a composite of nano-sized zeolite beta and hierarchical zeolite Y using a mixing method.

The demand for petrochemicals has led to research in a number of feedstocks and improvements to processes for forming a petrochemical. Processes described herein may be used to directly convert crude oil or a portion of the crude oil to petrochemicals. One challenge for these processes is that about 10-20 weight % (wt. %) of the 540° C.+ fraction may be rejected from the system to reduce coke formation and improve operation of steam crackers. The catalyst system described herein increases the conversion of the 540° C.+ fraction conversion to light fractions, increasing the yield of olefins and the profitability of the process. To implement this, catalysts that are less sensitive to wide variations in the boiling point of feedstocks have been developed.

The distillates, such as naphtha, that may be used for olefin production using a steam cracking process are limited and produced from costly and energy intensive processes. By upgrading the crude oil using the catalyst described herein, the crude can be directly used as a steam cracking feedstock. The catalyst described herein can be also applied to fluid catalytic cracking (FCC) catalysts and hydrocracking catalysts to improve product yields and quality.

The hydrocracking catalyst described herein is a composite of nano-sized zeolite beta and hierarchical zeolite Y. By incorporating nano-sized features on the framework topology of zeolite Y, the diffusion limitations of large saturated polyaromatics molecules of heavy oil can be reduced. Due to the large external surface and high acidity, the nano-sized zeolite beta assists the cracking of the large molecules. The products of the cracking from the nano-size zeolite beta may then diffuse into the adjacent hierarchical zeolite Y for further cracking. Through the synergic reactions of the two zeolite topologies, an increased amount of heavy oil can be converted to a high value naphtha fraction, which may be used as a feedstock for steam cracking and reforming. The catalyst described herein may also enhance the conversion of middle-distillate/VGA products to a naphtha fraction.

To obtain high yields of olefins and aromatics, such as benzene, toluene, and xylenes (BTX), the preferred feedstock to a steam cracker is highly paraffinic with low polyaromatic content. Using these feedstocks, the formation of undesirable products and coke is reduced. Generally, the lighter the feeds, the higher the yields of olefins and BTX. Therefore, if heavy fractions in a crude oil feed stream can be converted to naphtha fractions, the yield of olefin and BTX can be increased.

Compared with other feedstocks used for steam cracking, such as natural gas, naphtha, or atmospheric gas oil (AGO, 180-350° C. fraction), crude oils include more impurities and polyaromatics which cannot be directly converted by steam cracking. Thus, the crude feedstocks not only need to be hydroprocessed to remove the impurities, such as S, N, and metals, and convert polyaromatics, but also to further convert the heavy fraction to lighter fractions, more preferably to naphtha fraction. Unlike the narrow fractions, the whole crude comprises both light and heavy fractions. During hydrocracking catalyst development, research has focused on the conversion of the heavy residue conversion to avoid coking in steam cracking, and also the conversion of VGO and diesel fraction to naphtha in order to improve the benefit margin.

The most commonly used catalyst for hydrocracking are based on zeolite Y or zeolite beta. However, the pore size of the zeolite Y or zeolite beta is too small to allow the large molecules in a heavy oil fraction to diffuse into the active sites located inside the zeolite. To solve the problems, the zeolite pore sizes may be increased and the particle sizes of the zeolites may be reduced. Larger pore sizes have led to the development of mesoporous zeolite. Metals may be incorporated into the catalyst either through mixing or through impregnation methods. The mixing methods are performed prior to the final calcining of the catalyst, while the impregnation methods are performed on the final calcined catalyst supports.

FIG. 1 is a method 100 for forming a composite of nano-sized zeolite beta and hierarchical zeolite Y using a mixing method. The method begins at block 102, wherein the hierarchical zeolite Y is synthesized. This may be performed using the process described in the examples. At block 104, a zeolite beta gel comprising particles of nano-sized zeolite beta is synthesized, for example, using the procedure described in the examples.

At block 106, after separation from the forming solution, water is added to the nano-sized zeolite beta gel to form a slurry. The amount of water is based on the desired consistency of the slurry, and may depend on the amount of liquid left in the nano-sized zeolite beta gel. In an embodiment, the slurry is formed from about 90% nano-sized zeolite beta gel and about 10% water by volume. In another embodiment, the slurry is formed from about 75% nano-sized zeolite beta gel and about 25% water by volume. In another embodiment, the slurry is formed from 50% nano-sized zeolite beta gel and 50% water by volume. In another embodiment, the slurry is formed from about 25% nano-sized zeolite beta gel and about 75% water by volume. In another embodiment, the slurry is formed from about 10% nano-sized zeolite beta gel and about 90% water by volume.

At block 108, the hierarchical zeolite Y is thoroughly mixed with the nano-sized zeolite beta gel to form a composite. This may be performed by vigorously stirring the nano-sized zeolite beta gel while slowly adding the hierarchical zeolite Y. The stirring may be performed with a lab mixer, or using a magnetic stir set to a high setting.

At block 110, the composite is dried. This may be performed by heating the composite to between about 90° C. and about 130° C., or to between about 100° C. and about 120° C., or to between about 105° C. and 115° C., or to about 110° C. The composite may be held at the elevated temperature for about 2 to about 10 hours, or for about 4 to about 8 hours, or for about 6 hours.

Alternatively, the composite may be hydrothermally treated, for example, under steam at an elevated temperature and pressure. In some embodiments, the hydrothermal treatment is performed under steam at a pressure of about 0.5 MPa, 0.1 MPa, or about 0.1 5 MPa. The hydrothermal treatment may be performed at a temperature of between about 450° C. and about 600° C., or between about 500° C. and about 550° C., or about 525° C. The composite may be held at this temperature for about 1 to about 4 hours, or about 2.5 hours.

At block 112, the dried composite may be mixed with one or more metal sources, alumina, and a binder to form an extrudable paste. This is described further in the examples. In an embodiment, the metal source is molybdenum oxide ($MoO_3$), nickel nitrate, or both. At block 114, the paste is extruded to form extrudates. As referred to herein, extrudates are catalyst particles formed by cutting an extruded catalyst rope into discrete particles in a pelletizer. The extrudates may be any number of shapes, such as cylinders, tri-lobes, tetra-lobes, stars, wheels, or any other shapes generally known in the catalytic arts. At block 116, the extrudates are dried. This may be performed as described with respect to the drying of the composite at block 110.

At block 118, the extrudates are calcined. The calcination may be performed at about 400° C., about 500° C., or about 600° C. The extrudates may be held at the high temperature for about 2 hours, about 4 hours, or about 6 hours.

For Ni—Mo catalysts, the catalysts may have the following composition: $MoO_3$: 14-16 wt. %; NiO: 4-6 wt. %; and zeolite: 10-60 wt. %. The ratio of hierarchical zeolite Y to nano-sized zeolite beta ratio is between about 1:5 and 5:1. The alumina support is about 20-80 wt. % of the total catalyst.

Figure 2:
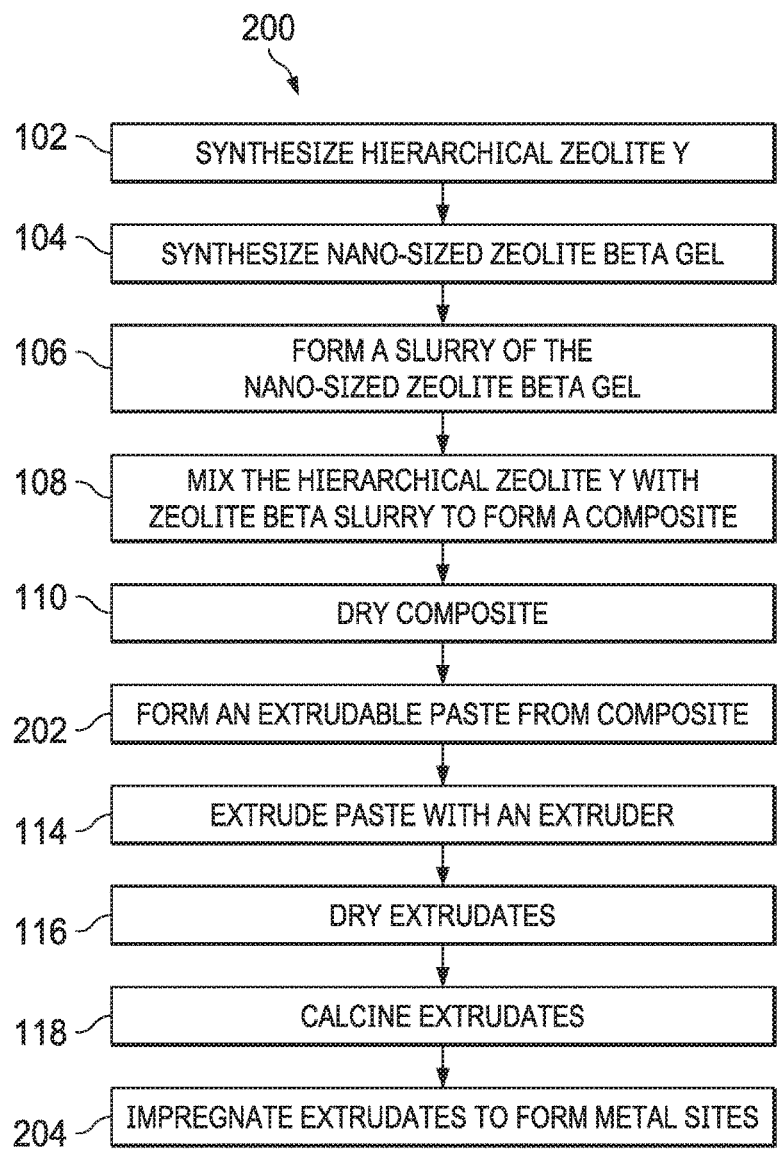
FIG. 2 is a method for forming a catalyst from an impregnated composite of nano-sized zeolite beta and hierarchical zeolite Y.

FIG. 2 is a method 200 for forming a catalyst from an impregnated composite of nano-sized zeolite beta and hierarchical zeolite Y. Like numbered items are as described with respect to FIG. 1. In this method 200, the metals are omitted from the formation of the extrudable paste at block 202. Accordingly, after the extrudates are calcined at block 118, at block 204, metals may be impregnated into the extrudates to form active metal sites. This may be performed by soaking the calcined extrudates in a metal solution to form impregnated extrudates, which may then be dried and calcined. The impregnation can be incipient wetness impregnation (IWI), also called capillary impregnation or dry impregnation, or excess solution impregnation (ESI). Both are commonly used techniques for the synthesis of heterogeneous catalysts. Typically, for IWI, the active metal precursor is dissolved in an aqueous solution. Then the metal-containing solution is added to a catalyst support containing the same pore volume as the volume of the solution that was added. Capillary action draws the solution into the pores. The catalyst can then be dried and calcined to remove the volatile components in the solution, depositing the metal on the catalyst surface. For ESI, about two times (volume) of metal containing impregnation solution is added to the catalyst support. At room temperature, the support is impregnated with the solution for 3-8 hours. The impregnation time depends on how quick the solution is adsorbed by the support and the time to reach the equilibrium (the metal concentration in the pores of the support is equal to the bulk solution). In our catalyst preparation, the metal components for preparing impregnation solution are nickel nitrate hexahydrate and ammonium metatungstate. Based on the volume of the support, the appropriate amount of the metal components is dissolved in deionized water, and then maintain at room temperature for 3-8 hours. For IWI, because all solution is adsorbed, the wet extrudates or pellets are directly dried at 100-120° C. for 8-24 hours, and calcined at 500-550° C. for 4-8 hours. For ESI, the excess solution is decanted, and the wet extrudates or pellets are dried at 100-120° C. for 8-24 hours, and acclimated at 500-550° C. for 4-8 hours.

For Ni—W catalysts, the catalysts may have the following composition: $WO_3$: 20-26 wt. %; NiO: 4-6 wt. %; and zeolite: 10-60 wt. %. The ratio of hierarchical zeolite Y to nano-sized zeolite beta ratio is between about 1:5 and 5:1. The alumina support is about 10-70 wt. % of the total catalyst.

Figure 3:
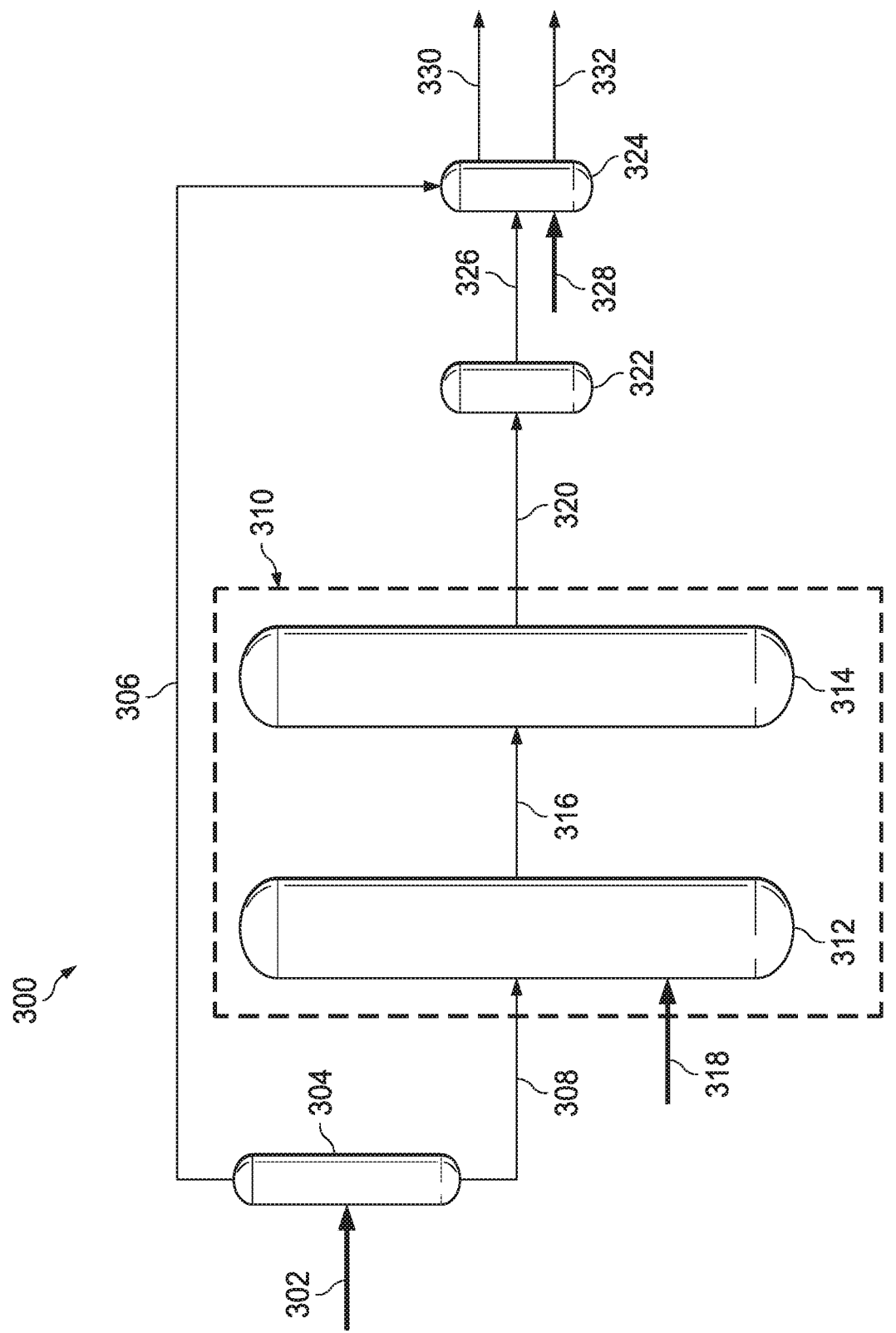
FIG. 3 is an example of a processing facility that directly converts crude oil into petrochemicals, including both olefinic and aromatic petrochemicals.

FIG. 3 is an example of a processing facility 300 that directly converts crude oil into petrochemicals, including both olefinic and aromatic petrochemicals. The catalyst described herein may be used in this processing facility, although the number and types of units are not limited to the example shown.

In some embodiments, a feed stream 302 of crude oil or condensate, is received into a feedstock separation system 304 of the processing facility 300. The feedstock separation system 304 separates the feed stream 302 into a light fraction or lights stream 306, such as less than about 180° C. light fraction (e.g. light naphtha or heavy naphtha fraction), and a heavy fraction or heavies stream 308, such as greater than about 160° C. or greater than about 180° C. The heavies stream 308 is then fed to a hydroprocessing system 310, for example, using the hierarchical catalyst described herein to broaden the range of carbon numbers that may be processed by the hydroprocessing system 310. In other embodiments, the feed stream is not separated before being fed to the hydroprocessing system 310.

In some examples, the feedstock separation system 304 can be a flash separation device such as a flash drum. For instance, the feedstock separation system 304 can be a single stage separation device such as a flash separator. In various embodiments, the cut point is about 160° C. or about 180° C. In some embodiments, the feedstock separation system 304 can operate in the absence of a flash zone. For instance, the feedstock separation system 304 can include a cyclonic separation device, a splitter, or another type of separation device based on physical or mechanical separation of vapors and liquids. In a cyclonic phase separation device, vapor and liquid flow into the device through a cyclonic geometry. The vapor is swirled in a circular pattern to create forces that cause heavier droplets and liquid to be captured and channeled to a liquid outlet. Vapor is channeled to a vapor outlet. The cyclonic separation device operates isothermally and with very low residence time. The cut point of the feedstock separation system 304 can be adjusted based on factors such as the vaporization temperature, the fluid velocity of the material entering the feedstock separation system 304, or both, or other factors.

The heavies stream 308 is routed to a hydroprocessing system 310 which includes a hydrotreating reactor 312 for removal of impurities. The hydrotreating reactor 312 can carry out one or more of the following processes, generally in separate layers or zones, hydrodemetallization, hydrodearomatization, hydrodenitrogenation, and hydrodesulfurization. In some examples, the hydrotreating reactor 312 can include multiple catalyst beds, such as two, three, four, five, or another number of catalyst beds. In some examples, the hydrotreating reactor 312 can include multiple reaction vessels each containing one or more catalyst beds of the same or different function. The hydrotreating reactor 312 provides a feedstock 316 for a downstream hydrocracking reactor 314 which converts heavier fractions in the feedstock 316 to light products.

As used herein, a system is an integrated group of processing equipment configured to perform a particular function, such as separations, hydroprocessing, cracking, hydrogen production, and the like. Further, some systems may include vessels to perform multiple functions. For example, a hydroprocessing system may include separation vessels to separate products into multiple streams. A system may include a single vessel, or multiple vessels, and all associated catalysts, pumps, valves, compressors, and process equipment used to perform the designated function.

For example, the hydroprocessing system 310 may include a single vessel for hydrotreating reactor 312 having a single catalyst zone or multiple catalyst zones. In other examples, the hydroprocessing system 310 includes multiple hydrotreating reactor vessels, including multiple zones, or both, wherein each reactor or zone may use different catalysts and conditions to perform different functions, such as hydrodesulfurization, hydrodemetallation, and the like. A hydrogen feed 318 is provided to the hydroprocessing system 310, for example, to the hydrotreating reactor 312 or both the hydrotreating reactor 312 and the hydrocracking reactor 314.

In some examples, hydroprocessing increases the paraffin content or decreases the viscosity as measured by the Bureau of Mines Correlation Index (BMCI) of a feedstock, such as using the catalyst composition described herein. For example, the heavies stream 308 separated from the feed stream 302 may be improved by saturating multiple carbon-carbon bonds followed by hydrocracking of aromatics, especially polyaromatics, for example, using the hierarchical catalyst described herein.

When hydrotreating a crude oil, contaminants, such as metals, sulfur, and nitrogen, can be removed by passing the feedstock through a series of catalysts, for example, in the hydrotreating reactor 312. In some examples, the sequence of catalysts to perform hydrodemetallization (HDM) and hydrodesulfurization (HDS) can include a hydrodemetallization catalyst, an intermediate catalyst, and a hydrodesulfurization catalyst. In an embodiment, the hydrotreating reactor 312 includes a series of layered catalyst beds forming zones. For example, an HDM zone may form a top layer, over an intermediate or transition zone, and an HDS zone, among others. In some embodiments, a hydrodenitrogenation (HDN) zone, a hydrodearomatization (HDA) zone, or both may be included in layers in the hydrotreating reactor 312.

The catalyst in the HDM zone can be based on a gamma alumina support, with a surface area of between about 140 $m^2/g$ and about 240 $m^2/g$. This catalyst has a very high pore volume, such as a pore volume in excess of about 1 $cm^3/g$. The pore size can be predominantly macroporous, which provides a large capacity for the uptake of metals on the surface of the catalyst and optionally dopants. The active metals on the catalyst surface can be sulfides of nickel (Ni), molybdenum (Mo), or both, with a molar ratio of Ni:(Ni+Mo) of less than about 0.15. The concentration of nickel is lower on the HDM catalyst than other catalysts as some nickel and vanadium is anticipated to be deposited from the feedstock itself, thus acting as a catalyst. In some examples, the catalyst can be in the form of alumina extrudates or alumina beads. For instance, alumina beads can be used to facilitate unloading of the catalyst HDM beds in the reactor as the metal can uptake will range between from 30 to 100% at the top of the bed.

The transition zone can be used to perform a transition between the hydrodemetallization and hydrodesulfurization functions. The intermediate catalyst can have intermediate metal loadings and pore size distribution. The catalyst in the hydrotreating reactor 312 (also termed the HDM/HDS reactor) can be an alumina based support in the form of extrudates, at least one catalytic metal from group VI (for instance, molybdenum, tungsten, or both), or at least one catalytic metals from group VIII (for instance, nickel, cobalt, or both), or a combination of any two or more of them. The catalyst can contain at least one dopant, such as one or more of boron, phosphorous, halogens, and silicon. The intermediate catalyst in the transition zone can have a surface area of between about 140 $m^2/g$ and about 200 $m^2/g$, a pore volume of at least about 0.6 $cm^3/g$, and mesoporous pores sized between about 12 nm and about 50 nm.

The catalyst in the HDS zone can include gamma alumina based support materials with a surface area towards the higher end of the HDM range, such as between about 180 $m^2/g$ and about 240 $m^2/g$. The higher surface for the HDS catalyst results in relatively smaller pore volume, such as a pore volume of less than about 1 $cm^3/g$. The catalyst contains at least one element from group VI, such as molybdenum, and at least one element from group VIII, such as nickel. The catalyst also contains at least one dopant, such as one or more of boron, phosphorous, silicon, and halogens. In some examples, cobalt (Co) can be used to provide relatively higher levels of desulfurization. The metals loading for the active phase is higher as the desired activity is higher, such that the molar ratio of Ni:(Ni+Mo) is between about 0.1 and about 0.3 and the molar ratio of (Co+Ni):Mo is between about 0.25 and about 0.85.

A final zone is in the hydrocracking reactor 314, for example, using the hierarchical catalyst described herein as a hydroprocessing catalyst, such as a hydrocracking catalyst. In this zone, heavy compounds, such as polyaromatics, among others, are cracked to form lighter products. In some embodiments, the product stream 320 may include hydrogen, ammonia, hydrogen sulfide, and $C_1$-$C_4$ gases, among others. In other embodiments, the hydrotreating reactor 312 has removed most of the impurities, and the product stream 320 from the hydrocracking reactor include hydrogen, $C_1$-$C_4$ gases, and other light hydrocarbons.

In some embodiments described herein, the hydroprocessing system 310 processes the heavies stream 308 with hydrogen from the hydrogen feed 318. The hydrogen feed 318 can be either imported to the hydroprocessing system 310, be produced in the hydrocracking reactor 314, or both. The hydrogen may be added at 0.1 mol %, 0.5 mol %, 1 mol %, 5 mol %, or higher, as a proportion of the heavies stream 308.

The reactors 312 and 314 of the hydroprocessing system 310 can operate at a temperature between about 300° C. and about 450° C., such as about 300° C., about 350° C., about 400° C., about 450° C., or another temperature. The reactors 312 and 314 of the hydroprocessing system 310 can operate at a pressure between about 30 bar and about 180 bar, such as about 30 bar, about 60 bar, about 90 bar, about 120 bar, about 150 bar, about 180 bar, or another pressure. The reactors 312 and 314 of the hydroprocessing system 310 can operate with a liquid hour space velocity between about $0.1h^{-1}$ and about $10h^{-1}$, such as about $0.1h^{-1}$, about $0.5h^{-1}$, about $1h^{-1}$, about $2h^{-1}$, about $4 h^{-1}$, about $6h^{-1}$, about $8h^{-1}$, about $10h^{-1}$, or another liquid hour space velocity. The liquid hour space velocity is the ratio of the flow rate of a reactant liquid through a reactor to the volume of the reactor. In some embodiments, the product stream 320, for example, including materials with carbon numbers of $C_1$-$C_5$, is provided to a products separation system 322 for further separation and processing.

The product separation system 322 may be a cyclonic separator, a flash drum, or any other type of unit described with respect to the feedstock separation system 304. In the product separation system 322, the product stream 320 is separated into streams including, for example, hydrogen, ammonia, hydrogen sulfide, $C_1$-$C_4$ gases, and liquid hydrocarbons, such as $C_5+$, among others. The hydrogen may be combined with the hydrogen feed 318 to the hydroprocessing system 310. The $C_1$-$C_4$ gases and liquid hydrocarbons are sent to a steam cracking system 324 as a steam cracker feed stream 326.

This may improve products from the steam cracking system 324 as the steam cracking of materials having higher hydrogen contents results in better products. Further, removing heavier components decreases the coking tendency in the steam cracker coils. The hydroprocessing system 310 also increases the amount of feed available to the steam cracking system 324 via conversion of heavier compounds to lighter compounds.

The steam cracking system 324 is a combination of gas and liquid furnaces. A steam stream 328 may be provided to one or more of the furnaces of the steam cracking system 324. The furnaces can be flexible or customized for some of the feed sent to the steam cracking system 324. The flow through the steam cracking furnaces of the steam cracking system 324 may provide a total exposure time of about 1 millisecond (ms), about 2 ms, about 5 ms, or about 10 ms. A quench tower may be provided immediately after the steam cracking furnace to cool the effluent from the steam cracking furnace and stop further reactions from taking place. The lights stream 306 provided from the feedstock separation system 304 may be used as a secondary feed.

Product streams formed in the steam cracking system 324 may include a chemicals stream 330, for example, including ethylene, propene, butene, benzene, toluene, and xylene, among others. A pyoil stream 332 may also be formed in the steam cracking system 324.

Figure 4:
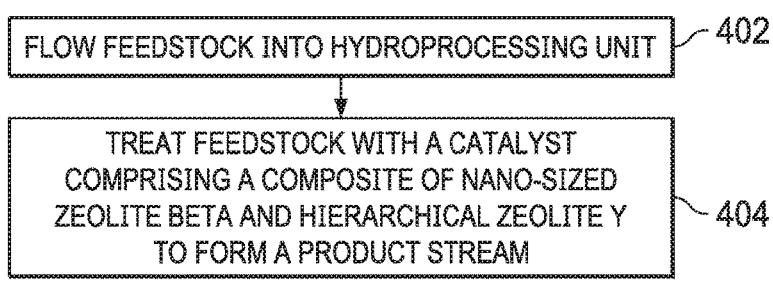
FIG. 4 is an example of a method for hydroprocessing a feedstock using the catalyst composition described herein

The product streams 330 and 332 may be provided to downstream systems for separation or the generation of further products, or both. For example, the product streams 330 and 332 may be provided to a products separation system that includes all systems for producing the chemical products from the steam cracking process. In various embodiments, the products separation system includes quench columns, primary fractionation columns, compressors, and sets of columns to allow the production of separate streams for ethylene, propylene, mixed $C_4$s, and BTX. As described herein, BTX refers to benzene, toluene, and xylene, which may be provided as a mixed aromatics stream, or may be further separated in the products separation system into individual product streams. The products separation system may also include a high-distillation temperature (HDT) and aromatics separation section to treat the pygas and separate BTX from this stream. It may also include selective hydrogenation systems to saturate the tri-olefins produced in the steam cracking furnaces FIG. 4 is an example of a method 400 for hydroprocessing a feedstock using the catalyst composition described herein. The method 400 begins at block 402, when the feedstock is flowed into the hydroprocessing unit. At block 404, the feedstock is treated with a catalyst comprising a composite of nano-sized zeolite beta and hierarchical zeolite Y to form a product stream.

EXAMPLES

The main properties of the zeolites and catalysts were characterized by BET, XRD, and XRF, among other techniques, as described below. The hydrocracking performances were evaluated in high through-put reactors and an in-house pilot plant.

Materials

Tetraethyl amine hydroxide (TEAOH) was obtained from Sigma Aldrich (CAS77-98-5, 35% TEAOH in H2O) and used as is. CBV-760 was obtained from Zeolyst and used as is. Cetyltrimethylammonium bromide (CTAB) was obtained from Sigma Aldrich (CAS 57-09-0, >98%) and used as is.

Characterization Test Procedures

Particle Size

The particle sizes of the catalyst compositions were measured by transmission electron microscopy (TEM).

X-Ray Analyses

The crystallinity and phase identity, e.g., zeolite beta versus zeolite Y, of the solid product was measured by powder X-ray diffraction (XRD) using a Rigaku Ultima IV multi-purpose diffractometer with a copper X-ray tube. The scanning range was set between 2° to 50° in 2θ Bragg-angles with a step size of 0.04° and the total counting time of 1° per minute. The crystallinity percentage was calculated by PANalytical High Score Plus software through the comparison of the area under the most intense diffraction peak to that of patterns of the reference zeolite.

X-ray fluorescence (XRF) was used to measure the atomic composition of the catalyst. The Si and Al content were measured by the XRF (X-ray florescence), and then used to calculate the $SiO_2/Al_2O_3$ molar ratio.

Surface Area and Pore Volume

Surface area and pore volume were measured using a physisorption analyzer (Autosorb IQ from Quantachrome Instruments). Nitrogen adsorption at 77 K is a commonly applied technique to determine various characteristics of porous materials. The amount of adsorbed nitrogen is measured as a function of the applied vapor pressure, which comprises the adsorption isotherm.

Characteristics that were derived from the nitrogen adsorption isotherm include total pore volume calculated by total nitrogen adsorbed and surface area. The most widely used procedure for the determination of the surface area of porous materials is the Brunauer-Emmett-Teller (BET) method. Brunauer-Emmtett-Teller (BET) theory aims to explain the physical adsorption of gas molecules on a solid surface and serves as the basis for an important analysis technique for the measurement of the specific surface area of materials. In 1938, Stephen Brunauer, Paul Hugh Emmett, and Edward Teller published the first article about the BET theory in the Journal of the American Chemical Society. The BET theory applies to systems of multilayer adsorption and usually utilizes probing gases that do not chemically react with material surfaces as adsorbates to quantify specific surface area. Nitrogen is the most commonly employed gaseous adsorbate used for surface probing by BET methods.

For this reason, standard BET analysis is most often conducted at the boiling temperature of $N_2$ (77 K). Specific surface area is a scale-dependent property, with no single true value of specific surface area definable, and thus quantities of specific surface area determined through BET theory may depend on the adsorbate molecule utilized and its adsorption cross section. The BET surface area is calculated by constructing a BET plot using the relative pressure range up to 0.3. In this part of the isotherm a single layer (or monolayer) of nitrogen molecules is formed on the surface.

Synthesis

The general method used to form the hierarchical zeolite Y was as follows: (1) CBV series zeolite with high SiO2/Al2O3 molar ratio (>20) from Zeolyst was treated with 0.2-5.0M aqueous $NH_3$ and CTAB solution (CTAB/zeolite mass ratio=0.1-2) at 60-120° C. for 1-48 hour, (2) the treated zeolite Y was washed with deionized water to pH=7-8, and dried at 100-120° C. 10-24 hours, and (3) the dried zeolite was calcined at 500-600° C. for 2-8 hours.

Specifically, 2.7 g of CBV-760 from Zeolyst was added to a beaker, and 30 g of 0.5 molar ammonium hydroxide solution was added to the beaker. The solution was stirred at 60° C. for 4 hours to form a zeolite slurry. In another beaker, 1.0 g of CTAB was dissolved and 45 g of purified H2O. This solution was stirred at room temperature for 4 hours to form a CTAB solution.

The CTAB solution was added to the zeolite slurry, and the resulting solution was stirred at room temperature for 24 hours. The mixture was transferred into a bottle, and placed in an oven. The mixture was then heated at 80° C. for 24 hours.

The resulting solid product was separated by vacuum filtration. The product was washed twice with water, using about 10 times as much volume of water as the solid product. The resulting solid product was dried in an oven at 110° C. overnight. The temperature was ramped from the 110° C. drying temperature at a ramp rate of 2° C./min to a final calcining temperature of 500° C. The solid product was then held at 500° C. for 4 hours.

A second hierarchical zeolite Y was formed using CBV-720, also from Zeolyst. The same procedures described above were used to form this hierarchical zeolite Y. The two hierarchical zeolite Y products were characterized using XRD and BET. The results are shown in Table 1 below.

TABLE 1

Characterization of hierarchical zeolite Y

| Name | Meso Y-1 | Meso Y-2 |
|---|---|---|
| Starting zeolite | CBV-760 | CBV-720 |
| $SiO_2/Al_2O_3$ molar ratio | 60 | 30 |
| Results | | |
| XRD crystallinity, % | 86 | 92 |
| BET analysis | | |
| Surface area, $m^2/g$ | 1011 | 841 |
| Pore volume, ml/g | 0.85 | 0.60 |
| Micro pore volume | 0.18 | 0.26 |
| Pore size, A | 32.0 | 28.0 |
| External surface, $m^2/g$ | 710 | 351 |

The nano-sized zeolite beta was synthesized using the following procedure. 0.27 g of aluminum metal was dissolved in 20 g of an aqueous solution containing 35 wt. % TEAOH. The solution was heated to 50° C. under vigorous stirring until all of the metal was completely dissolved, forming a clear aluminum solution. In another beaker, 12 g of fumed silica was added to 11.25 g of the aqueous solution containing 35 wt. % TEAOH. This was stirred until a uniform aluminosilicate fluid gel was formed.

The aluminum solution was added to the aluminosilicate fluid gel. This was stirred for 4 hours to form a slurry. The slurry was then transferred to a 125 mL PTFE lined stainless steel autoclave. The autoclave was mounted on a rotation rack installed inside an oven. The autoclave was then rotated at 60 RPM while being heated to 170° C. for 3 days. The autoclave was then quenched to room temperature, and the solid product was separated from the liquid using an ultracentrifuge at 10,000 RPM. The resulting solid product was washed with purified water twice, and was separated from the liquid in the ultracentrifuge between each washing and after the washing was completed. The resulting solid product was dried in an oven at 110° C. overnight. The temperature was ramped from the 110° C. drying temperature at a ramp rate of 2° C./min to a final calcining temperature of 550° C. The solid product was then held at 550° C. for 4 hours. The main properties of the nano-sized zeolite beta and hierarchical zeolite Y are summarized in Table 2.

TABLE 2

The main properties of the nano-sized zeolite beta and hierarchical zeolite Y

| No. | Z-1 | Z-2 |
|---|---|---|
| Zeolite | Nano-sized beta | Hierarchical zeolite Y |
| Particle sizes, nm | 30-60 | 500 |
| XRD phase | Zeolite beta | Zeolite Y |
| $SiO_2/Al_2O_3$ molar ratio | 50 | 38 |
| BET results | | |
| Specific surface area, $m^2/g$ | 555 | 841 |
| Pore volume, ml/g | 0.54 | 0.60 |
| Mesopore volume, ml/g | 0.19 | 0.34 |
| Mesopore to total pore volume, % | 35% | 57% |
| Average pore size, nm | 18 | 23 |

A first Mo—Ni catalyst with Z-1 and Z-2 was synthesized using a mixing method. A second Mo—Ni catalyst with a composite of Z-1 and Z-2 was synthesized using an impregnation method.

In the mixing method, a binder was prepared by mixing 27.3 Catapal alumina from Sasol with a diluted nitric acid solution. The nitric acid solution was prepared by mixing 3.22 mL of a concentrated nitric acid (67-69 wt. %) into 68.16 g of water. The binder was mixed to form a paste. A mixture of 37.8 g of the hierarchical zeolite Y (meso Y-1), 20.3 g of the nano-sized zeolite beta, 15 g of $MoO_3$, 20 g of $Ni(NO_3)_2 \cdot 6H_2O$, and 10.3 g of Pural alumina (from Sasol) was made and thoroughly mixed to form a uniform mixture. This mixture was added to the binder paste and mixed to form an extrudable paste. Depending on the consistency, some amount of water was added to enhance extrusion. The amount of water added is to make sure the mixture forms a tacky agglomerate under light pressure. The extrudable paste was then extruded, and a pelletizer was used to make extrudates. The extrudates were dried at 110° C., and calcined for 4 hours at 500° C.

In the impregnation method, a binder was prepared by mixing 27.3 Catapal alumina from Sasol with a diluted nitric acid solution. The nitric acid solution was prepared by mixing 3.22 mL of a con nitric acid (67-69 weight percent) into 68.16 g of water. The binder was mixed to form a paste. A mixture of 47.8 g of the hierarchical zeolite Y (meso Y-1), 36.3 g of the nano-sized zeolite beta, and 8.2 g of Pural alumina was mixed thoroughly to form a uniform mixture. The binder paste was added to the uniform mixture and mix to form an extrudable paste. Depending on the consistency, some amount of water was added to enhance extrusion. The extrudable paste was then extruded, and a pelletizer was used to make extrudates. The extrudates were dried at 110° C., and calcined for 4 hours at 550° C. The calcined extrudates was impregnated with 200 mL of an aqueous solution of tungsten (W) and nickel (Ni). The aqueous solution was prepared using of nickel nitrate hexahydrate (in an amount equivalent to 11.11 g of NiO/100 mL) and ammonium metatungstate (in an amount equivalent to 44.44 g of $WO_3$/100 mL). For example, the calcined extrudates may be soaked in the metal solution to form ion-exchanged extrudates. The impregnated extrudates were dried at 110° C., and calcined for 4 hours at 500° C. The composition of the resulting catalysts are summarized in Table 3.

TABLE 3

Composition of the Mo-Ni catalysts

| No. Composition, wt. % | CAT A | CATB | DHC-22 | CAT C |
|---|---|---|---|---|
| $MoO_3$ | 15 | 15 | 15 | 15 |
| NiO | 5 | 5 | 5 | 5 |
| Zeolite Z-1 | | 50 | 10 | 20 |
| Zeolite Z-2 | 50 | | 40 | 30 |
| $Al_2O_3$ | 30 | 30 | 30 | 30 |

Processing Tests

The reaction performance with Arab light crude was evaluated in HTE high through-put reactor system. The test conditions are listed in Table 4, along with the results. The results showed the invented catalysts had higher initial activity than the catalysts made using individual zeolites. As shown in Table 4, under the same conditions, the catalyst with the composite of hierarchical zeolite Y and nano-sized zeolite beta has much higher<180° C. light fraction yield (84.9 wt. % vs 53.8-61.6 wt. %), compared with the catalysts with only hierarchical zeolite Y or only nano-sized zeolite beta.

TABLE 4

Reaction performance comparisons of catalysts

| Catalyst Zeolite Reaction conditions | Feed | CAT C Composite | CAT B nano-beta | CAT A Zeolite Y |
|---|---|---|---|---|
| Temperature, ° C. | | 390 | 390 | 390 |
| Pressure, bar | | 150 | 150 | 150 |
| LHSV, $h^{-1}$ | | 1.0 | 1.0 | 1.0 |
| $H_2$/oil ratio, v/v | | 1200 | 1200 | 1200 |
| Product properties | | | | |
| S, wppm | 298 | 15 | 9.5 | 4.2 |
| N, wppm | 20 | <1 | <1 | <1 |
| Density | 0.8306 | 0.7886 | 0.7742 | 0.7758 |
| Product yields | | | | |
| $C_1$-$C_4$ | | 6.0 | 13.4 | 5.8 |
| <180° C. | 18.9 | 84.9 | 61.6 | 53.8 |
| 180-350° C. | 41.7 | 8.0 | 21.2 | 33.9 |
| 350-540° C. | 30.4 | 0 | 2.12 | 5.3 |
| >540° C. | 9.1 | 0 | 0 | 0 |

An embodiment described in examples herein provides a method for forming a composite of nano-sized zeolite beta and hierarchical zeolite Y. The method includes synthesizing a hierarchical zeolite Y, synthesizing a gel of a nano-sized zeolite beta, forming a slurry of the nano-sized zeolite beta from the gel, and mixing the hierarchical zeolite Y with the slurry to form a composite. The composite is dried and an extrudable paste is formed from the dried composite. The extrudable paste is extruded to form extrudates, which are calcined to form calcined extrudates.

In an aspect, a metal source is mixed with the dried composite while forming the extrudable paste. In an aspect, the metal source includes molybdenum. In an aspect, the metal source includes molybdenum oxide ($MoO_3$). In an aspect, the metal source includes nickel. In an aspect, the metal source includes nickel nitrate.

In an aspect, the calcined extrudates are impregnated with a metal. In an aspect, the metal includes tungsten. In an aspect, the metal includes nickel.

In an aspect, impregnating the calcined extrudates with the metal includes soaking the calcined extrudates in a solution including the metal to form ion exchanged extrudates, drying the ion exchanged extrudates, and calcining the ion exchanged extrudates. In an aspect, the solution including the metal includes ammonium metatungstate. In an aspect, solution including the metal includes nickel nitrate hexahydrate.

Another embodiment described in examples herein provides a method for directly hydroprocessing a crude oil to form petrochemicals. The method includes flowing a feedstock including at least a portion of the crude oil into a hydroprocessing unit, and hydroprocessing the feedstock using a catalyst including a composite of nano-sized zeolite beta and hierarchical zeolite Y to form a product stream.

In an aspect, the composite of nano-sized zeolite beta and hierarchical zeolite Y, is formed by method that includes synthesizing the hierarchical zeolite Y, synthesizing the gel of nano-sized zeolite beta, forming a slurry of the nano-sized zeolite beta, and mixing the hierarchical zeolite Y with the slurry to form a composite. The composite is dried and an extrudable paste is formed from the dried composite. The extrudable paste extruded to form extrudates, which are calcined to form calcined extrudates.

In an aspect, forming the extrudable paste includes incorporating molybdenum and nickel. In an aspect, the calcined extrudates are impregnated with nickel and tungsten.

In an aspect, the feedstock includes greater than about 5% hydrocarbons with a boiling point of greater than about 540° C., and the product stream includes less than about 1% hydrocarbons with a boiling point of greater than about 540° C. In an aspect, the product stream is fed to a steam cracker.

Another embodiment described in examples herein provides a hydroprocessing catalyst including a composite of nano-sized zeolite beta and hierarchical zeolite Y, including particles of nano-sized zeolite beta of less than about 100 nm, and particles of hierarchical zeolite Y of about 500 nm.

In an aspect, a ratio of the nano-sized zeolite beta to the hierarchical zeolite Y is about 20/80. In an aspect, a ratio of the nano-sized zeolite beta to the hierarchical zeolite Y is about 50/50.

In an aspect, the hydroprocessing catalyst includes between about 14 weight percent and about 16 weight percent molybdenum oxide, and about 4 weight percent and about 6 weight percent nickel oxide. In an aspect, the hydroprocessing catalyst includes between about 14 weight percent and about 16 weight percent molybdenum oxide, and between about 4 weight percent and about 6 weight percent nickel oxide.

In an aspect, the composite is formed by synthesizing a hierarchical zeolite Y, synthesizing a nano-sized zeolite beta gel, forming a slurry of the nano-sized zeolite beta, and mixing the hierarchical zeolite Y with the slurry to form a composite. The composite is dried and an extrudable paste is formed from the dried composite. The extrudable paste is extruded to form extrudates, which are calcined to form calcined extrudates.

In an aspect, forming the extrudable paste includes mixing the extrudable paste with molybdenum oxide and nickel nitrate. In an aspect, the calcined extrudates are impregnated with tungsten and nickel.

Other implementations are also within the scope of the following claims.

What is claimed is:

1. A method for directly hydroprocessing a crude oil to form petrochemicals, comprising:
    flowing a feedstock comprising at least a portion of the crude oil into a hydroprocessing unit; and
    hydroprocessing the feedstock using a catalyst comprising a composite of nano-sized zeolite beta and hierarchical zeolite Y to form a product stream, wherein the product stream is fed to a steam cracker.

2. The method of claim 1, wherein the composite of nano-sized zeolite beta and hierarchical zeolite Y, is formed by method comprising:
    synthesizing the hierarchical zeolite Y;
    synthesizing a gel of nano-sized zeolite beta;
    forming a slurry of the nano-sized zeolite beta;
    mixing the hierarchical zeolite Y with the slurry to form a composite;
    drying the composite to form a dried composite;
    forming an extrudable paste from the dried composite;
    extruding the extrudable paste to form extrudates; and
    calcining the extrudates to form calcined extrudates.

3. The method of claim 2, wherein forming the extrudable paste comprises incorporating molybdenum and nickel, and wherein treating the extrudable paste further comprises:
    extruding the extrudable paste to form extrudates; and
    calcining the extrudates to form calcined extrudates.

4. The method of claim 2, wherein treatment of the extrudable paste comprises:
    extruding the extrudable paste to form extrudates; and
    calcining the extrudates to form calcined extrudates followed by impregnation of the calcined extrudates with nickel and tungsten.

5. The method of claim 1, wherein the feedstock comprises greater than about 5% hydrocarbons with a boiling point of greater than about 540° C.; and the product stream comprises less than about 1% hydrocarbons with a boiling point of greater than about 540° C.

6. The method of claim 1, wherein the catalyst comprises a composite of nano-sized zeolite beta and hierarchical zeolite Y, comprising:
    particles of nano-sized zeolite beta of less than about 100 nm; and
    particles of hierarchical zeolite Y of about 500 nm.

7. The method of claim 1, comprising a ratio of the nano-sized zeolite beta to the hierarchical zeolite Y of about 20/80 by weight.

8. The method of claim 1, comprising a ratio of the nano-sized zeolite beta to the hierarchical zeolite Y of about 40/60 by weight.

9. The method of claim 1, the catalyst comprising:
    between about 14 weight percent and about 16 weight percent molybdenum oxide; and
    about 4 weight percent and about 6 weight percent nickel oxide.

10. The method of claim 1, wherein the composite is formed by:
    synthesizing a hierarchical zeolite Y;
    synthesizing a nano-sized zeolite beta gel;
    forming a slurry of the nano-sized zeolite beta;
    mixing the hierarchical zeolite Y with the slurry to form a composite;
    drying the composite to form a dried composite;
    forming an extrudable paste from the dried composite;
    extruding the extrudable paste to form extrudates; and
    calcining the extrudates to form calcined extrudates.

11. The method of claim 10, wherein forming the extrudable paste comprises mixing the extrudable paste with molybdenum oxide and nickel nitrate.

12. The method of claim 10, wherein the calcined extrudates are impregnated with tungsten and nickel.

* * * * *